US011777938B2

(12) United States Patent
Jain et al.

(10) Patent No.: US 11,777,938 B2
(45) Date of Patent: Oct. 3, 2023

(54) GATEKEEPER RESOURCE TO PROTECT CLOUD RESOURCES AGAINST ROGUE INSIDER ATTACKS

(71) Applicant: Microsoft Technology Licensing, LLC, Redmond, WA (US)

(72) Inventors: Neeraj Jain, Telangana (IN); Vijayendra Gopalrao Vasu, Telangana (IN); Vijay Krishna Tandra Sistla, Telangana (IN); Kirushna Kumaar Ganesan, Telangana (IN); Sumit Malhotra, Telangana (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 417 days.

(21) Appl. No.: 17/030,503

(22) Filed: Sep. 24, 2020

(65) Prior Publication Data
US 2022/0094686 A1  Mar. 24, 2022

(51) Int. Cl.
*H04L 9/40* (2022.01)
*H04L 67/1097* (2022.01)

(52) U.S. Cl.
CPC ............ *H04L 63/101* (2013.01); *H04L 63/08* (2013.01); *H04L 63/102* (2013.01);
(Continued)

(58) Field of Classification Search
CPC ..... H04L 63/101; H04L 63/08; H04L 63/102; H04L 63/108; H04L 63/20;
(Continued)

(56) References Cited

U.S. PATENT DOCUMENTS 8,881,244 B2 * 11/2014 Bhogal ............... G06F 21/6218
713/193
10,200,194 B2   2/2019 Field et al.
(Continued)

FOREIGN PATENT DOCUMENTS

EP          3429156 A1    1/2019
KR      20140137135 A    12/2014

OTHER PUBLICATIONS

"Granular Privileges", Retrieved from: https://web.archive.org/web/20171211151918/https:/docs.marklogic.com/guide/security/granular, Dec. 11, 2017, 5 Pages.
"Veritas NetBackup™ Security and Encryption Guide", Retrieved from: https://www.veritas.com/content/support/en_US/doc/21733320-127424841-0/v32256146-127424841, Sep. 25, 2017, 434 Pages.
(Continued)

*Primary Examiner* — Kambiz Zand
*Assistant Examiner* — Aubrey H Wyszynski
(74) *Attorney, Agent, or Firm* — Ray Quinney & Nebeker

(57) ABSTRACT

The present disclosure relates to methods and systems for protecting cloud resources. The methods and systems may use a virtual gatekeeper resource to enforce secure access controls to cloud resources for a list of privileged operations. The cloud resources and the virtual gatekeeper resource may be in different security domains within a cloud computing system and the cloud resources may be linked to the virtual gatekeeper resource. A request may be sent to perform a privileged operation on the cloud resource. Access may be provided to the virtual gatekeeper resource in response to approval of the request and the access to the virtual gatekeeper resource may be used to perform the privileged operation on the cloud resource.

20 Claims, 6 Drawing Sheets

(52) U.S. Cl.
CPC ............ *H04L 63/108* (2013.01); *H04L 63/20* (2013.01); *H04L 67/1097* (2013.01)

(58) Field of Classification Search
CPC ............... H04L 67/1097; H04L 63/105; G06F 21/40; G06F 2221/2137; G06F 21/629
USPC ............................................................ 726/1
See application file for complete search history.

(56) References Cited

U.S. PATENT DOCUMENTS

| | | | |
|---|---|---|---|
| 10,382,429 | B2 | 8/2019 | Agrawal et al. |
| 2017/0329957 | A1 | 11/2017 | Vepa et al. |
| 2018/0115551 | A1* | 4/2018 | Cole .................... H04L 63/083 |
| 2020/0053107 | A1 | 2/2020 | Jayawardena et al. |
| 2020/0382610 | A1* | 12/2020 | Chandrashekar ....... H04L 43/20 |

OTHER PUBLICATIONS

Metcalf, Sean, "From Workstation to Domain Admin: Why Secure Administration Isn't Secure and How to Fix It", In Black Hat, Aug. 4, 2018, 106 Pages.

Ross, et al., "Privileged Access Workstations", Retrieved from: https://docs.microsoft.com/en-us/windows-server/identity/securing-privileged-access/privileged-access-workstations, Mar. 13, 2019, 55 Pages.

"Security Domain—Wikipedia", Retrieved From <<https://en.wikipedia.org/w/index.php?title=Security%20domain%20&oldid=382216243>>, Sep. 1, 2020, 1 Page.

Flynn, et al., "Best Practices Against Insider Threats for All Nations", In Proceedings of IEEE Third Worldwide Cybersecurity Summit, Oct. 30, 2012, 8 Pages.

"International Search Report and Written Opinion Issued in PCT Application No. PCT/US21/034688", dated Sep. 8, 2021, 14 Pages.

* cited by examiner

GATEKEEPER RESOURCE TO PROTECT CLOUD RESOURCES AGAINST ROGUE INSIDER ATTACKS

BACKGROUND

In a traditional information technology (IT) environment where customers deploy their own infrastructure, servers and applications, a copy of the application data is backed up to an offsite tape facility. The offsite tape facility not only provides physical isolation of the backup but also provides security isolation. To recall or delete the tapes, the backup administrator must place a request and the organizational head, who acts as the gatekeeper, must approve such highly critical requests before the request is processed. In addition, the entire process is audited, and all of this is done to prevent insider attacks in an organization. This makes sure the IT head cannot be a malicious insider and prevents a single point of failure in the system. Similarly, the business head cannot initiate the request for tapes as the business owner is not the owner of these tapes or tape systems.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a cloud computing system. The cloud computing system may include one or more processors; memory in electronic communication with the one or more processors; and instructions stored in the memory, the instructions being executable by the one or more processors to: create a cloud resource in a different security domain of a cloud computing system than a secure security domain where a virtual gatekeeper resource resides, wherein the virtual gatekeeper resource prevents a list of privileged operations from occurring without prior approval; establish a virtual gatekeeper resource link between the cloud resource and the virtual gatekeeper resource to secure the cloud resource using the virtual gatekeeper resource, wherein the virtual gatekeeper resource enforces secure access control to the cloud resource for the list of privileged operations; receive a request to perform a privileged operation of the list of privileged operations on the cloud resource, wherein the request includes an identification of the virtual gatekeeper resource linked with the cloud resource and an identification of a user sending the request; perform an authorization validation on the request to authorize the user to access the cloud resource; perform a link validation to verify that the identification of the virtual gatekeeper resource linked to the cloud resource is a correct virtual gatekeeper resource; and provide just-in-time access to the virtual gatekeeper resource in response to the authorization validation and the link validation for the user to perform the privileged operation.

Another example implementation relates to a method. The method may include creating a cloud resource in a different security domain of a cloud computing system than a secure security domain where a virtual gatekeeper resource resides, wherein the virtual gatekeeper resource prevents a list of privileged operations from occurring without prior approval. The method may include establishing a virtual gatekeeper resource link between the cloud resource and the virtual gatekeeper resource to secure the cloud resource using the virtual gatekeeper resource, wherein the virtual gatekeeper resource enforces secure access control to the cloud resource for the list of privileged operations. The method may include receiving a request to perform a privileged operation of the list of privileged operations on the cloud resource, wherein the request includes an identification of the virtual gatekeeper resource linked with the cloud resource and an identification of a user sending the request. The method may include performing an authorization validation on the request to authorize the user to access the cloud resource. The method may include performing a link validation to verify that the identification of the virtual gatekeeper resource linked to the cloud resource is a correct virtual gatekeeper resource. The method may include providing the user just-in-time access to the virtual gatekeeper resource in response to the authorization validation and the link validation to perform the privileged operation.

Another example implementation relates to a method. The method may include creating a cloud resource in a security domain of a cloud computing system. The method may include linking the cloud resource to a virtual gatekeeper resource in a secure security domain in the cloud computing system, wherein the virtual gatekeeper resource enforces secure access control to the cloud resource for a list of privileged operations associated with the virtual gatekeeper resource. The method may include receiving just-in-time access to the virtual gatekeeper resource linked to the cloud resource for an allotted time period in response to approval of the privileged operation request. The method may include performing the one or more privileged operations on the cloud resource using the just-in-time access to the virtual gatekeeper resource during the allotted time period.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
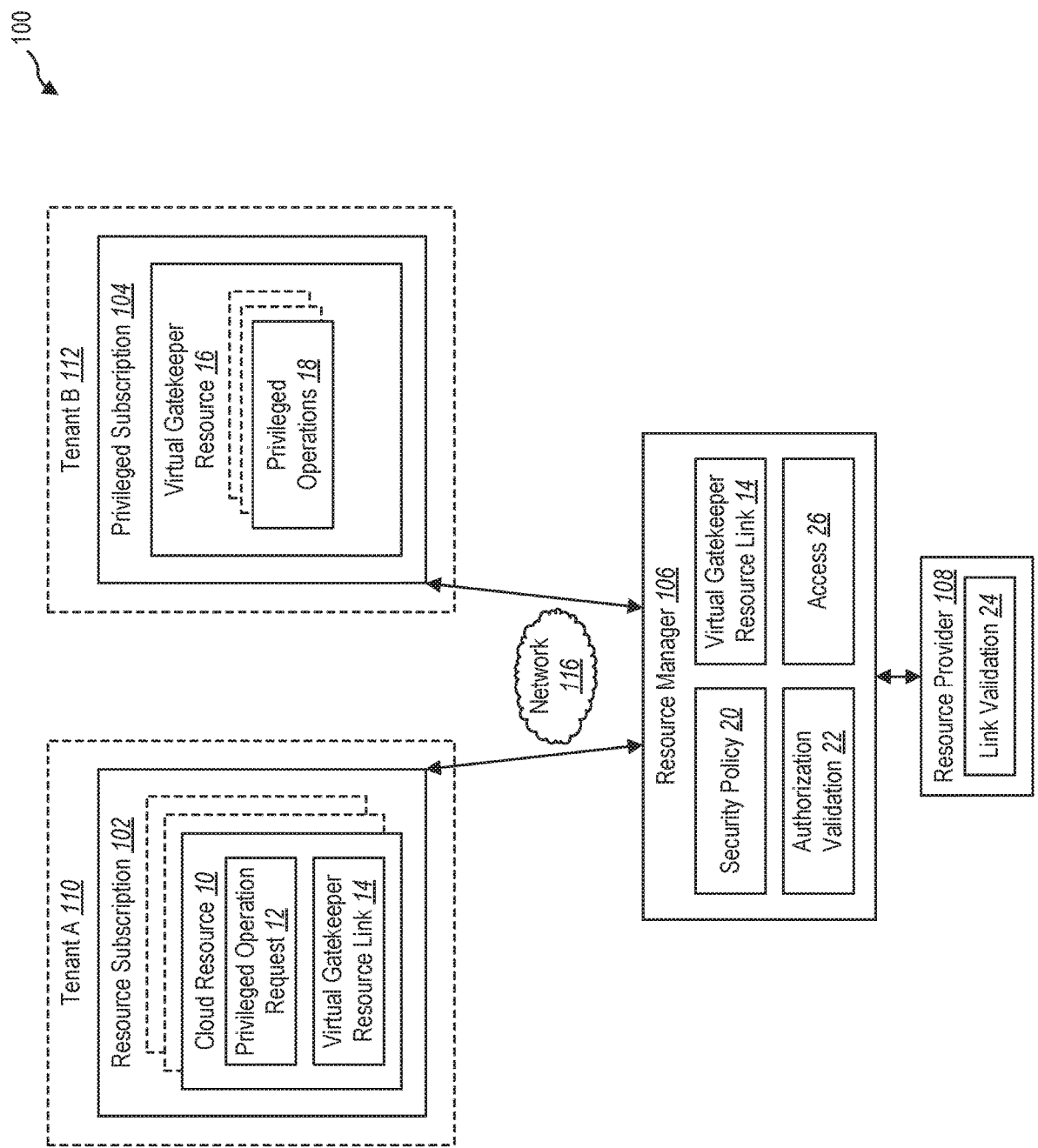
FIG. 1 illustrates an example cloud computing system in accordance with an implementation of the present disclosure.

This disclosure generally relates to protecting cloud resources. In the cloud environment, where the physical servers and applications themselves are shifted to cloud-based applications, the backup data is stored in cloud backup storage as cloud backup storage provides various advantages of cost savings and ease of use. Although the cloud backup storage is durable with copies in multiple datacenters, the access control mechanisms for cloud backup storage do not provide adequate airgaps to prevent the administrator from recalling or destroying the backup data.

In addition, in a cloud environment, resources are managed by different personas in an organization to perform specific functions such as application updates, infra maintenance, compliance, security, backup and so on. Each of these personas are assigned access to a set of specific operations at a designated scope, which typically follows a policy of providing access on need basis. However, resource administrator or owner roles, across the cloud object hierarchy, have full access at that level. In this model, any administrator can execute privileged operations and destroy the resource with malicious intentions.

Current solutions offer just-in-time access to resources and logon time multi-factor authentication, but current solutions do not distinguish between the owner of the backup data and an approver for destructive actions. Typically, an owner of a resource has full permissions to delete the resource in the cloud environments but that is undesirable in malicious insider attacks. For example, resource owners have role permissions which allow resource owners to arbitrarily assign resource permissions to themselves. Secondly, current approaches do not allow for classification of operations that are critical and must go through multi-user authentication at a granular level.

Moreover, other solutions may provide access to block privileged operations but do not support any other means to get this access when required and are not flexible to support various scenarios. For example, Resource Management Locks exists today but they have few limitations. The locks may be created in the same security domain (subscription). In addition, current lock levels support blocking HTTP PUT/POST (Read-Only lock) or HTTP DELETE (Delete lock). However, current lock levels are too restrictive and non-contextual. For example, some POST/PUT operations might be harmless and can be allowed but will get blocked and vice versa. Moreover, lock objects may not notify resource providers (RP)s about these locks being created and/or deleted, which may be important as RPs may choose to create or delete the locks.

The present disclosure relates to methods and devices for protecting any cloud resource against malicious insider attacks. The present disclosure provides a virtual gatekeeper model to enforce the same level of security control over backup data in cloud-based environments as traditional IT environments. To protect privileged operations on critical cloud resources from such malicious insider attacks, the methods and devices may build a virtual gatekeeper resource to enforce secure access control of cloud resources. Any privileged operation initiated by an administrator requires access to the virtual gatekeeper resource, in addition to the target resource access, which is approved by a separate person or entity in the organization. The virtual gatekeeper resource and the approver are in a different security domain so that administrators cannot elevate themselves and have access to the cloud resources and/or provide access permissions to the cloud resources. The present disclosure includes several practical applications that provide benefits and/or solve problems associated with protecting cloud resources.

The methods and devices may include a security administrator (SA) that owns the security domain (subscription and/or tenant) where the virtual gatekeeper resource is hosted, which is separate from the cloud resource security domain. The resource owner of the cloud resource does not have access to the security administrator and/or the virtual gatekeeper resource. The resource owner may acquire just-in-time access on the virtual gatekeeper resource with approval from the SA before the resource owner may execute any privileged operation on the cloud resources.

The methods and devices may devise a new mechanism with operation level flexibility but devoid of above limitations such that it may be easier for customers to understand and implement. In addition, the methods and devices may be modelled as platform capability for other resource types as well. The methods and devices may also leverage privileged identity management (PIM) for multi-factor authentication (MFA)/MUA capabilities.

As such, the methods and devices may make it possible to enforce the same level of security control over backup data in cloud based environments as traditional IT environments. Any deletion or removal of backup data initiated by an IT head always requires access to the virtual gatekeeper (the gatekeeper resource) which is approved by a separate person or entity (namely a business head) in the organization. The approver and the gatekeeper resource are in a different security domain so the IT head cannot elevate themselves to provide themselves with access to the gatekeeper resource. Nor can the business head initiate the delete request as the business head is not the owner of backup resource.

Referring now to FIG. 1, an example cloud computing system 100 for use with protecting cloud resources 10 may include any number of resource subscriptions 102 for containing one or more resource groups. Each resource group may include a plurality of cloud resources 10. Cloud resources 10 may include, but are not limited to, virtual machines, applications, and/or storage accounts. The cloud resources 10 may have a resource owner that may have access to the cloud resources 10. In addition, each resource subscription 102 may have a subscription administrator that may have access to the resource groups and/or cloud resources 10 stored within the resource subscription 102. The plurality of resource subscriptions 102 may be included in Tenant A 110. Tenant A 110 may have a tenant administrator that may have full access to any cloud resource 10 within Tenant A 110.

Cloud computing system 100 may also include a privileged subscription 104 with one or more virtual gatekeeper resources 16. Virtual gatekeeper resources 16 may enforce secure access control to the cloud resources 10. Virtual gatekeeper resources 16 may be used to protect the cloud resources 10 by preventing one or more privileged operations 18 (up to n privileged operations, where n is an integer) from occurring on the cloud resources 10 without prior approval. The privileged operations 18 may be critical operations a security administrator may want to protect. Examples of privileged operations 18 may include, but are not limited to, disabling soft delete, modifying backup configurations, updating a customer managed key (CMK) used to encrypt backups, unlinking from the virtual gatekeeper resource 16, modifying policies, and/or any other operation that may delete or remove data. By using the virtual gatekeeper resource 16, any privileged operations 18 initiated on the cloud resources 10 may require access to the virtual gatekeeper resource 16, in addition, to access to the cloud resource 10.

The privileged subscription 104 is in a different security boundary or security domain than the resource subscription 102. By having the resource subscription 102 in a different security domain than the privileged subscription 104, the subscription administrator of the privileged subscription 104 and/or a resource owner of cloud resource 10 may not access privileged subscription 104 or the virtual gatekeeper resource 16 without receiving approval for the access. As such, the subscription administrator and/or the resource owner may not elevate themselves and provide themselves access to the virtual gatekeeper resource 16.

In an implementation, the privileged subscription 104 and the resource subscription may be in different tenants within cloud computing system 100. Tenants may include different user accounts with one or more subscriptions. For example, resource subscription 102 may be in Tenant A 110, while privileged subscription 104 may be in Tenant B 112. As such, tenant administrator of Tenant A 110 may not arbitrarily secure a privileged operation 18 protected by the virtual gatekeeper resource 16 without having approval from a tenant administrator or a designated approver of Tenant B 112.

The cloud resources 10 may be housed on one or more server devices in cloud computing system 100. One or more virtual machines may be implemented on the server devices. As such, the server devices may include any number and a variety of virtual machines that may house the various cloud resources 10 in cloud computing system 100.

A subscription administrator and/or resource owner may access the one or more cloud resources 10 through one or more client devices via a network 116. The client devices may refer to various types of computing devices including, by way of example, mobile devices, desktop computers, server devices, or other types of computing devices. Network 116 may include one or multiple networks that use one or more communication platforms or technologies for transmitting data. For example, network 116 may include the internet or other data link that enables transport of electronic data between respective devices of the cloud computing system 100.

Resource subscription 102 and/or privileged subscription 104 may communicate with a resource manager 106 for cloud computing system 100. In an implementation, resource manager 106 may be remote from the subscriptions (e.g., resource subscriptions 102 and privileged subscriptions 104) and/or the tenants (e.g., Tenant A 110 or Tenant B 112) of cloud computing system 100. As such, the subscriptions (e.g., resource subscriptions 102 and privileged subscriptions 104) and/or the tenants (e.g., Tenant A 110 or Tenant B 112) may communicate with resource manager 106 via network 116.

Resource manager 106 may manage all the resources on cloud computing system 100, including, but not limited to, cloud resources 10 and/or virtual gatekeeper resources 16. Resource manager 106 may establish one or more security policies 20 for managing the resources on cloud computing system 100. In addition, one or more administrators may establish the security policies 20. The security policies 20 may be applied to any resource within cloud computing system 100 that may need to be protected. The same security policy 20 may apply to a plurality of cloud resources 10, a plurality of resource subscriptions 102, and/or an entire tenant. In addition, different security policies 20 may apply to different cloud resources 10, resource subscriptions 102, and/or different tenants.

The security policies 20 may identify a scope of protection for the various cloud resources 10. For example, the security policies 20 may identify a list of critical or privileged operations 18 protected by virtual gatekeeper resources 16. In an implementation, the list of privileged operations 18 may be a default list of operations to protect. As such, the list of privileged operations 18 may be preset or predefined. In another implementation, the list of privileged operations 18 may be customizable by, for example, a resource owner and/or a security administrator that selects a subset of critical operations to protect.

A security administrator may establish one or more virtual gatekeeper resources 16 and may determine a security boundary or security domain for the virtual gatekeeper resources 16. For example, the security administrator may specify a name and/or location of the virtual gatekeeper resources 16. The security domain for the virtual gatekeeper resources 16 may be secured with limited and/or restricted access to the security domain.

The security administrator may apply one or more security policies 20 to the virtual gatekeeper resources 16. The security policies 20 may identify the list of privileged operations 18 protected by the virtual gatekeeper resources 16. As such, each virtual gatekeeper resource 16 may include a list of privileged operations 18 that the virtual gatekeeper resource 16 protects.

The one or more security policies 20 may also restrict the access to the virtual gatekeepers resources 16 to a limited number of individuals and may ensure that a resource owners of cloud resources 10 and/or resource subscription 102 or tenant A 110 administrators may not have role assignment permissions on the virtual gatekeeper resources 16. As such, resource owners of cloud resources 10 and/or resource subscription 102 or tenant A 110 administrators may be unable to assign ownership rights to the virtual gatekeeper resources 16 and may be unable to perform the privileged operations 18 without prior approval.

In addition, the one or more security policies 20 may specify a deployment scope of the virtual gatekeeper resources 16. The security administrator may select one or more resource subscriptions 102 to manage using the virtual gatekeeper resources 16. As such, a single virtual gatekeeper resource 16 may protect multiple cloud resources 10 within the same or different resource subscriptions 102. The security administrator may ensure that the virtual gatekeeper resource 16 is in a different security boundary or security domain than the selected resource subscriptions 102 and/or the various cloud resources 10 protected by the virtual gatekeeper resource 16.

The security administrator through security policies 20 may establish a virtual gatekeeper resource link 14 between the cloud resources 10 within the selected resource subscriptions 102 and a virtual gatekeeper resource 16. The virtual gatekeeper resource link 14 may associate, or otherwise, link the cloud resource 10 to the virtual gatekeeper resource 16 so that the virtual gatekeeper resource 16 may be used to protect the cloud resources 10 by enforcing secure access controls for the cloud resources 10. In an implementation, the virtual gatekeeper resource link 14 may be requested during and/or after creation of the cloud resource 10.

The virtual gatekeeper resource link 14 may secure the cloud resources 10 using the virtual gatekeeper resource 16 by preventing the privileged operations 18 protected by the virtual gatekeeper resource 16 from being performed on the cloud resources 10 without prior approval. As such, a resource owner of the cloud resources 10 or a subscription administrator for the cloud resources 10 may not perform any of the privileged operations 18 protected by the virtual gatekeeper resource 16 without receiving authorization to perform the privileged operations 18. For example, the cloud resource 10 may send a privileged operation request 12 to resource manager 106 when a resource owner, a subscription administrator, or tenant administrator wants to perform one or more privileged operations 18. The privileged operation request 12 may include, but is not limited to, an identification (ID) of the virtual gatekeeper resource 16 linked to the cloud resource 10 and an identification of a user sending the request (e.g., resource owner or a subscription or tenant administrator).

Resource manager 106 may perform an authentication and/or authorization of any management operations performed on the resources within cloud computing system 100. Resource manager 106 may receive the privileged operation request 12 and may perform one or more authorization validations 22 to ensure or verify that a user requesting to perform the privileged operations 18 has a required level of access to the virtual gatekeeper resource 16.

In an implementation, the authorization validation 22 may leverage privileged identity management (PIM) for providing approvals for accessing the virtual gatekeeper resource 16. For example, the operation validation 22 may leverage PIM for multi-factor authentication (MFA)/multi-user authorization (MUA) capabilities of the user requesting to perform the privileged operations 18 and may provide just-in-time (JIT) access to the virtual gatekeeper resource 16 for the user. Multi-user authorization (MUA) includes a capability where, in addition to the requestor of the operation, one or more approvers are required to authorize the operation.

A PIM policy may determine a time period for accessing the virtual gatekeeper resource 16. The time period may include, for example, one hour or a few hours. As such, the allotted time period may limit any access 26 provided to the virtual gatekeeper resource 16 for performing the privileged operations 18 on the cloud resource 10. When an upper bound of the allotted time period is reached and/or exceeded, the access 26 to the virtual gatekeeper resource 16 may end.

The authorization validation 22 may also include performing a validity check on the allotted time to ensure that the privileged operation request 12 is received during the allotted time for performing the privileged operations 18. In addition, the authorization validation 22 may include authenticating the cloud resource 10. Thus, the authorization validation(s) 22 on the privileged operation request 12 may authorize the user to access the cloud resource 10.

Resource manager 106 may forward the privileged operation request 12 to a resource provider 108 in communication with resource manager 106. Resource provider 108 may perform a link validation 24 to ensure that the cloud resource 10 is linked to the virtual gatekeeper resource 16 originally selected for the cloud resource 10. The resource provider 108 may include a datastore storing the virtual gatekeeper resource link 14 and/or may store information regarding the virtual gatekeeper resource link 14. The resource provider 108 may compare the identification of the virtual gatekeeper resource 16 forwarded with the privileged operation request 12 with a datastore storing information regarding the virtual gatekeeper resource link 14 for the virtual gatekeeper resources 16 to ensure that the cloud resource 10 is linked to the correct virtual gatekeeper resource 16. For example, the correct virtual gatekeeper resource 16 may be identified based on a match occurring between the identification of the virtual gatekeeper resource 16 forwarded with the privileged operation request 12 and the information in the datastore regarding the virtual gatekeeper resource link 14 for the cloud resource 10.

In addition, the resource provider 108 may perform a verification that the requested operation is included in the list of privileged operations 18 protected by the virtual gatekeeper resource 16. For example, the resource provider 108 may receive a list of privileged operations 18 in response to the virtual gatekeeper resource 16 being created and/or updated.

A security administrator and/or a privileged identity approver may provide access 26 to the virtual gatekeeper resource 16 for the time period in response to the authorization validation 22 verifying that the user may access the virtual gatekeeper resource 16 and that the cloud resource 10 is linked to the correct virtual gatekeeper resource 16. As such, resource manager 106 may perform multiple levels of verifications prior to providing access 26 to the virtual gatekeeper resource 16.

The user may receive the access 26 to the virtual gatekeeper resource 16 and may use the virtual gatekeeper resource 16 to perform the requested privileged operations 18 within the time period. In an implementation, the access 26 may be just-in-time access to the virtual gatekeeper resource 16 provided on the scope of the virtual gatekeeper resource 16.

Each of the components 14, 20, 22, 24, 26, 108 of the resource manager 106 may be in communication with each other using any suitable communication technologies. In addition, while the components 14, 20, 22, 24, 26, 108 of the resource manager 106 are shown to be separate, any of the components or subcomponents may be combined into fewer components, such as into a single component, or divided into more components as may serve a particular implementation. As an illustrative example, components 14, 20, 22, 24, 26, 108 may be implemented on different server devices of the cloud computing system 100. As another illustrative example, one or more of the components 14, 20, 22, 24, 26, 108 may be implemented on an edge computing device that is not implemented on the hierarchy of devices of the cloud computing system 100.

Moreover, the components 14, 20, 22, 24, 26, 108 of the resource manager 106 may include hardware, software, or both. For example, the components of the resource manager 106 may include one or more instructions stored on a computer-readable storage medium and executable by processors of one or more computing devices. When executed by the one or more processors, the computer-executable instructions of one or more computing devices can perform one or more methods described herein. Alternatively, the components 14, 20, 22, 24, 26, 108 of the resource manager 106 may include hardware, such as a special purpose processing device to perform a certain function or group of functions. Additionally, or alternatively, the components 14, 20, 22, 24, 26, 108 of the resource manager 106 may include a combination of computer-executable instructions and hardware. The devices included in cloud computing system 100 may include features and functionality described below in connection with FIG. 6.

Cloud computing system 100 may provide more flexibility and/or customization in providing protection to cloud resources 10 by selecting which privileged operations 18 to protect and providing exclusive access to the selected privileged operations 18 using the virtual gatekeeper resource 16. In addition, by separating the cloud resources 10 and the virtual gatekeeper resources 16 in different security domains within the cloud computing systems 100, access to the virtual gatekeeper resources 16 may be restricted and rouge individuals may not be able to elevate themselves and may be prevented from assigning themselves ownership of the virtual gatekeeper resource 16. As such, cloud computing system 100 may be used for protecting any cloud resource 10 against malicious or rouge insider attacks.

Figure 2:
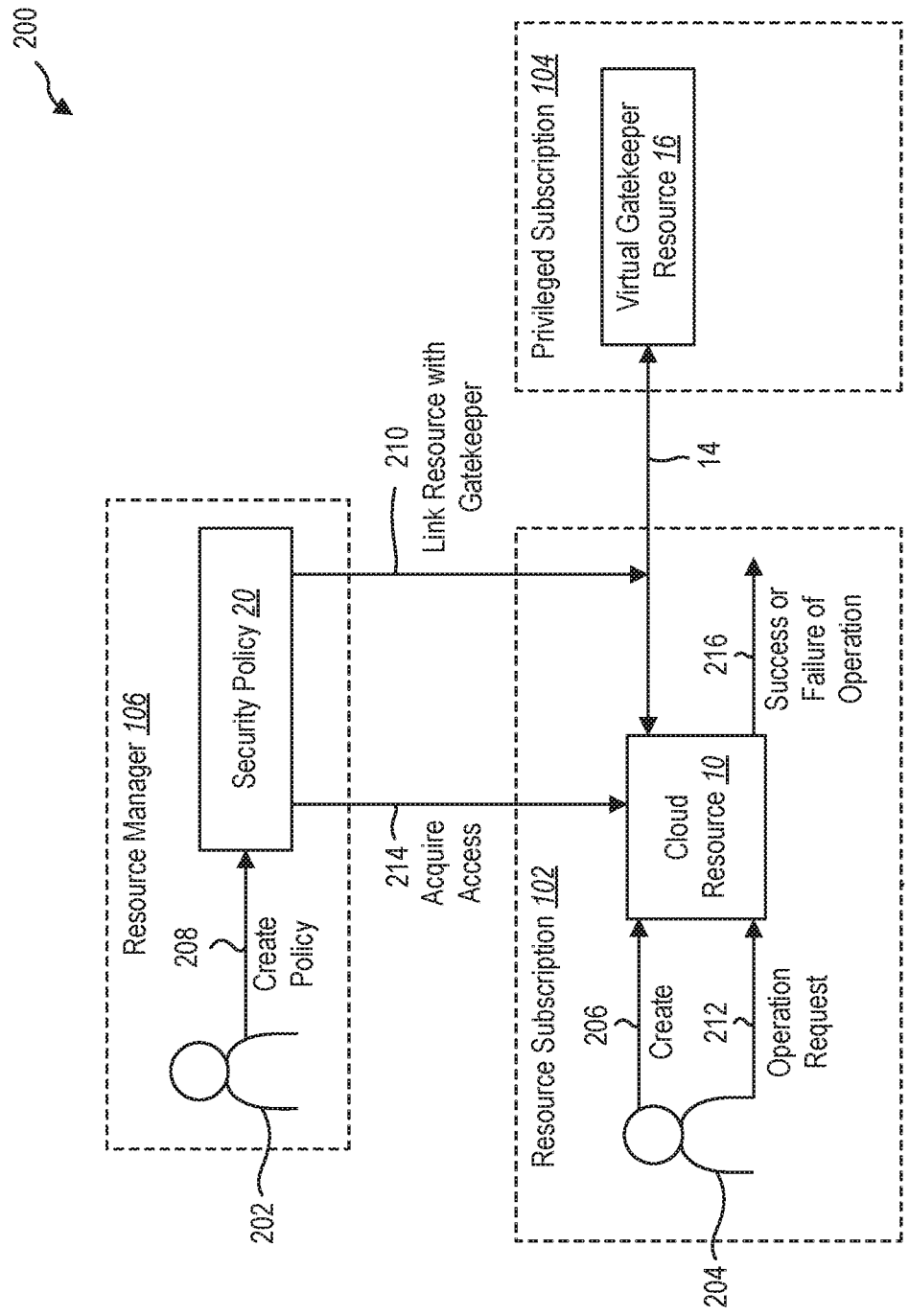
FIG. 2 illustrates an example method for creating cloud resources and securing the cloud resources using a virtual gatekeeper resource in accordance with an implementation of the present disclosure.

Referring now to FIG. 2, illustrated is a method 200 for creating cloud resources and securing the cloud resources using a virtual gatekeeper resource. The actions of method 200 may be discussed below with reference to the architectures of FIG. 1.

At 206, method 200 may include creating a cloud resource. For example, a resource owner 204 may send a request to create a cloud resource 10. The cloud resource 10 may reside in a resource subscription 102 and the resource owner 204 may have security privileges related to the cloud resource 10.

At 208, method 200 may include creating a security policy for the cloud resource. A security administrator 202 may create one or more security policies 20 for cloud resource 10. The security administrator 202 may own the security domain (e.g., privileged subscription 104 or Tenant B 112) where the virtual gatekeeper resource 16 is hosted. The security domain for the privileged subscription 104 is separate from the security domain for the cloud resource 10 (e.g., the security domain for the resource subscription 102 or Tenant A 110). As such, the security administrator 202 may not elevate themselves and have access to the cloud resources 10 and/or provide access permissions to the cloud resources 10.

The created security policies 20 may apply to multiple cloud resources 10. For example, a single security policy 20 may apply to all the cloud resources 10 within a resource subscription 102 or a tenant (e.g., Tenant A 110). The security administrator 202 and the resource owner 204 may not be the same individual. In addition, the security administrator 202 may not have access to the cloud resources 10 and the resource owner 204 may not have role assignment permissions on the virtual gatekeeper resource 16. As such, the resource owner 204 may not access the security administrator 202 and/or the virtual gatekeeper resource 16 without prior approval.

The security policies 20 may identify a list of privileged operations 18 protected by the virtual gatekeeper resources 16. As such, each virtual gatekeeper resource 16 may include a list of privileged operations 18 that the virtual gatekeeper resource 16 protects. The security policies 20 may also restrict the access to the virtual gatekeeper resources 16 to a limited number of individuals. In addition, the security policies 20 may specify a deployment scope of the virtual gatekeeper resources 16, such as, but not limited to, identifying subscriptions to manage using the virtual gatekeeper resources 16 and/or cloud resources 10 to manage using the virtual gatekeeper resources 16. The security policies 20 may also specify an allotted time period for accessing the virtual gatekeeper resources 16. For example, access to the virtual gatekeeper resources 16 may be restricted to a predetermined time period.

At 210, method 200 may include linking the cloud resource with a virtual gatekeeper resource. Resource owner 204 may send a request to link the cloud resource 10 with a virtual gatekeeper resource 16. For example, resource owner 204 or security policy 20 may send an application programming interface (API) call to the resource manager 106 requesting an establishment of a link between the cloud resource 10 and a virtual gatekeeper resource 16. Resource manager 106 may send the API call to resource provider 108 (FIG. 1) and resource provider 108 may establish a virtual gatekeeper resource link 14 between the cloud resource 10 and the virtual gatekeeper resource 16 in response to receiving the API call from the cloud resource 10. The virtual gatekeeper resource link 14 may be established during creation of the cloud resource 10 and/or after the cloud resource 10 is created and the virtual gatekeeper resource link 14 may be stored at the resource provider 108. The virtual gatekeeper resource link 14 may secure the cloud resource 10 using the virtual gatekeeper resource 16 by preventing the privileged operations 18 protected by the virtual gatekeeper resource 16 from being performed on the cloud resources 10 without prior approval.

At 212, method 200 may include receiving a privileged operation request for the cloud resource. Resource owner 204 may send a request to perform one or more privileged operations 18 on cloud resource 10. For example, resource owner 204 may send a privileged operation request 12 to resource manager 106 to disable soft delete on cloud resource 10.

At 214, method 200 may include acquiring access to the virtual gatekeeper resource 16 to perform a privileged operation on the cloud resource 10. Resource manager 106 may receive the privileged operation request 12 to perform the one or more privileged operations 18 on cloud resource 10 and may perform one or more authorizations and/or validations on the privileged operation request 12. The privileged operation request 12 may include a token with access related information for the cloud resource 10 and/or the resource owner 204. Resource manager 106 may perform an authorization validation 22 on the access related information to verify that the resource owner 204 may access the virtual gatekeeper resource 16. Resource manager 106 may leverage PIM and the MFA/MUA to acquire just-in-time access to the virtual gatekeeper resource 16 to execute a privileged operation on the cloud resource 10.

At 216, method 200 may include allowing the operation or preventing the operation on the cloud resource 10. If the resource owner 204 receives the required just-in-time access through PIM using MFA/MUA, resource manager 106 may provide authorization for access to the virtual gatekeeper resource 16. As such, the resource owner 204 may be allowed to perform one or more privileged operations 18 on the cloud resource 10.

However, if the resource manager 106 determines that the resource owner 204 is not authorized to access the virtual gatekeeper resource 16, resource manager 106 may prevent access to the virtual gatekeeper resource 16. Thus, the resource owner 204 may be prevented from performing one or more privileged operations 18 on the cloud resource 10.

Method 200 may make it possible to enforce the same level of security control over backup data in cloud based environments as traditional IT environment. By segregating the resource owner 204 and the security administrator 202 into different individuals with access to different security domains, method 200 may ensure that the resource owner 204 cannot assign themselves ownership of the virtual gatekeeper resource 16 and perform privileged operations 18 without approval from the security administrator 202. Moreover, method 200 may ensure that the security administrator 202 may not access the cloud resources 10 and perform operations on the cloud resources 10 without approval from the resource owner 204 or the subscription administrator of the resource subscription 102.

Figure 3:
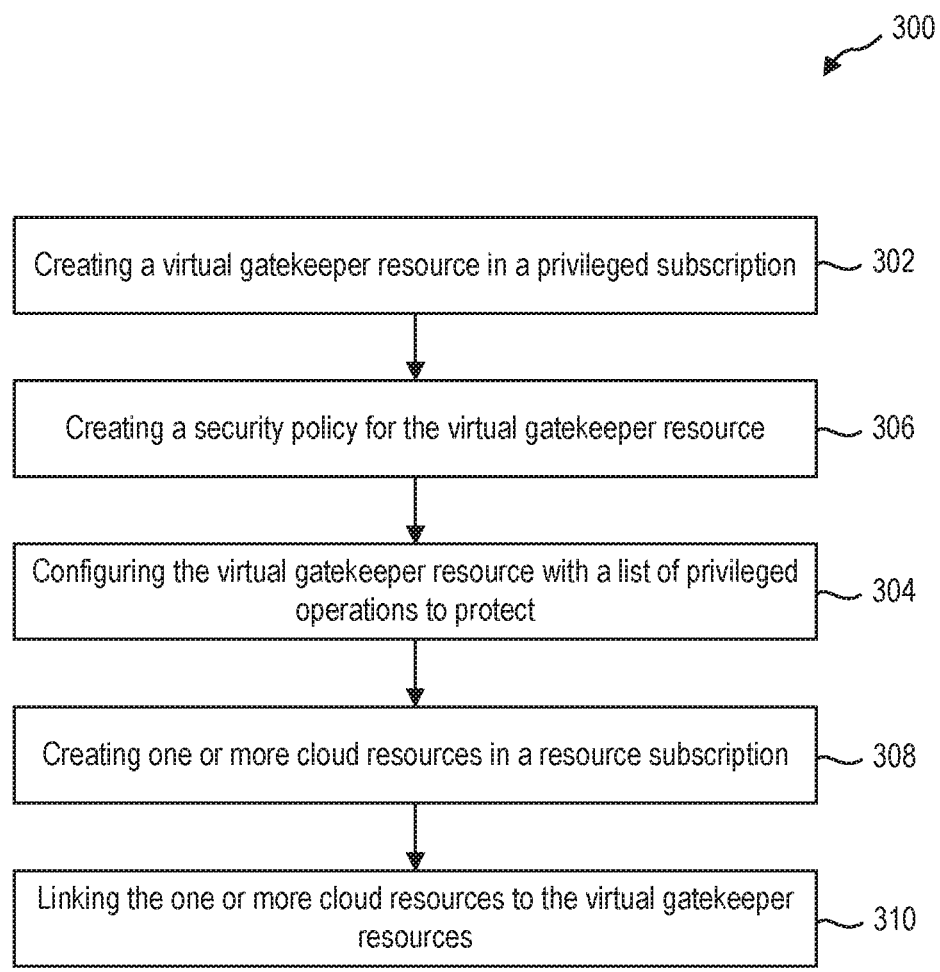
FIG. 3 illustrates an example method for creating a virtual gatekeeper resource and securing a cloud resource using the virtual gatekeeper resource in accordance with an implementation of the present disclosure.

Referring now to FIG. 3, illustrated is a method 300 for creating a virtual gatekeeper resource 16 (FIG. 1) and securing a cloud resource 10 (FIG. 1) using the virtual gatekeeper resource 16. The actions of method 300 may be discussed below with reference to the architectures of FIG. 1.

At 302, method 300 may include creating a virtual gatekeeper resource in a privileged subscription. A security administrator 202 (FIG. 2) may create one or more virtual gatekeeper resources 16 in a privileged subscription 104 to enforce secure access control to the cloud resources 10. For example, the security administrator 202 may use a template or form to provide the parameters to use when creating the virtual gatekeeper resources 16. The parameters may include, but are not limited to, specifying a name and location of the virtual gatekeeper resources 16. The privileged subscription 104 may be located within a secure security domain of the cloud computing system 100.

At 304, method 300 may include creating a security policy for the virtual gatekeeper resource. For example, a security administrator 202 may specify one or more security policies 20 for the virtual gatekeeper resource 16. Resource manager 106 may apply the one or more security policies 20 to the virtual gatekeeper resources 16. For example, the security policies 20 may identify the list of privileged operations 18 protected by the virtual gatekeeper resources 16 so that each virtual gatekeeper resource 16 may include a list of privileged operations 18 that the virtual gatekeeper resource 16 protects.

The security policies 20 may also restrict the access to the virtual gatekeepers resources 16 and/or the security domain to a limited number of individuals and may ensure that resource owners of cloud resources 10 and/or subscription administrators may not have role assignment permissions on the virtual gatekeeper resources 16. The security policies 20 may also specify an allotted time period for accessing the virtual gatekeeper resources 16. In addition, the security policies 20 may specify a deployment scope of the virtual gatekeeper resources 16. The deployment scope may include, but is not limited to, a location for the virtual gatekeeper resources 16, identifying subscriptions to manage using the virtual gatekeeper resources 16, and/or cloud resources 10 to manage using the virtual gatekeeper resources 16.

At 306, method 300 may include configuring the virtual gatekeeper resource with a list of privileged operations to protect. The privileged operations 18 may be critical operations a security administrator may want to protect. Examples of privileged operations 18 may include, but are not limited to, disabling soft delete, modifying backup configurations, updating a customer managed key (CMK) used to encrypt backups, unlinking from the virtual gatekeeper resource 16, modifying policies, and/or any other operation that may delete or remove data. The list of privileged operations 18 may be a default list of operations to protect. As such, the list of privileged operations 18 may be preset or predefined. In another implementation, the list of privileged operations 18 may be customizable by, for example, a resource owner 204 (FIG. 2) and/or a security administrator 202 that selects a subset of critical operations to protect.

One or more security policies 20 may be applied to virtual gatekeeper resource 16 to identify the list of privileged operations 18 to protect. Virtual gatekeeper resources 16 may be used to protect the cloud resources 10 by preventing one or more privileged operations 18 (up to n privileged operations, where n is an integer) from occurring on the cloud resources 10 without prior approval.

At 308, method 300 may include creating one or more cloud resources in a resource subscription. For example, a resource owner 204 may create one or more cloud resources 10 for a resource subscription 102. The cloud resources 10 may be in a different security boundary or security domain than a security domain for the virtual gatekeeper resources 16.

At 310, method 300 may include linking the one or more cloud resources to the virtual gatekeeper resource. A resource owner 204 sends a request to link the cloud resource 10 to a virtual gatekeeper resource 16 to resource manager 106. Resource manager 106 forwards the request to resource provider 108. Resource provider 108 establishes a virtual gatekeeper resource link 14 for the cloud resources 10 and the virtual gatekeeper resource 16 and stores the virtual gatekeeper resource link 14 in a datastore. In another implementation, security policy 20 may automatically send the request to resource manager 106 to create the virtual gatekeeper resource link 14. Resource manager 106 forwards the request to resource provider 108 and resource provider 108 establishes a virtual gatekeeper resource link 14 for the cloud resource 10 and the virtual gatekeeper resource 16 and stores the virtual gatekeeper resource link 14 in a datastore.

The virtual gatekeeper resource link 14 may associate, or otherwise, link the cloud resource 10 to the virtual gatekeeper resource 16 so that the virtual gatekeeper resource 16 may be used to protect the cloud resources 10 by enforcing secure access controls for the cloud resources 10.

Method 300 may be used to protect the cloud resources 10 using the virtual gatekeeper resource 16 so that any privileged operation 18 initiated on the cloud resource 10 requires access to the virtual gatekeeper resource 16. The access to the virtual gatekeeper resource 16 may be approved by a separate entity or individual, such as, the security administrator 202.

Figure 4:
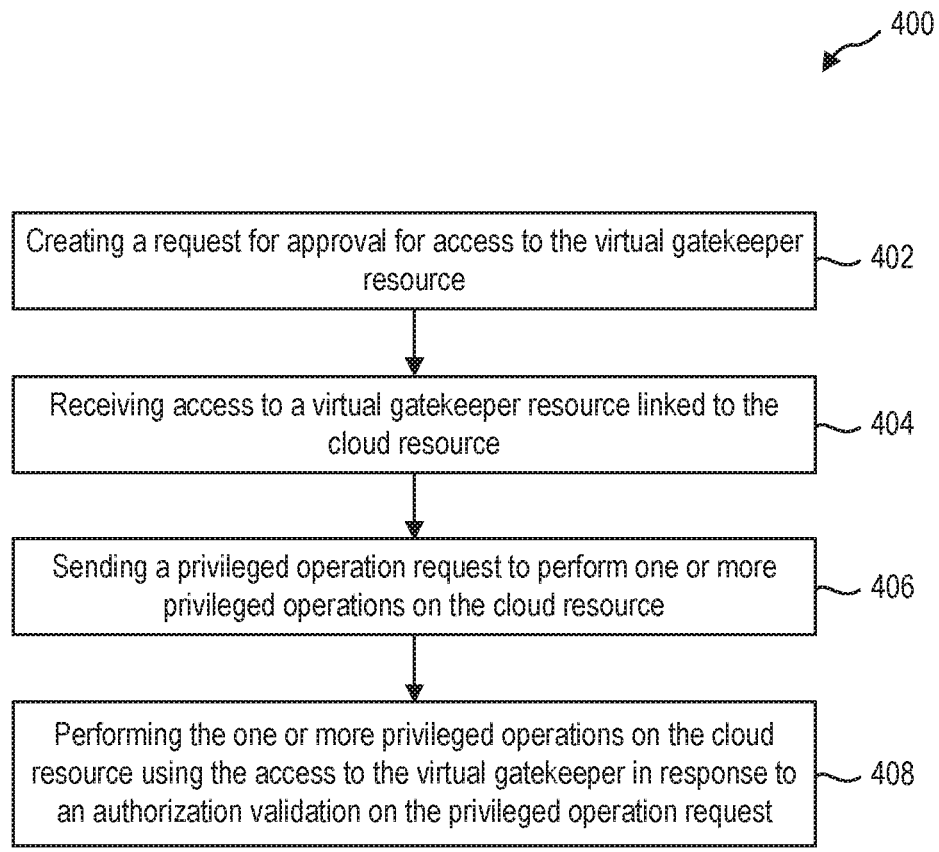
FIG. 4 illustrates an example method for performing a privileged operation on a cloud resource linked to a virtual gatekeeper resource in accordance with an implementation of the present disclosure.

Referring now to FIG. 4, illustrated is a method 400 for performing a privileged operation 18 on a cloud resource 10 linked to a virtual gatekeeper resource 16. The actions of method 400 may be discussed below with reference to the architectures of FIG. 1.

At 402, method 400 may include creating a request for approval for accessing the virtual gatekeeper resource. For example, a resource owner 204 and/or an administrator (e.g., subscription or tenant administrator) may create a PIM request for approval for accessing the virtual gatekeeper resource 16 to execute one or more privileged operations 18 on a cloud resource 10.

At 404, method 400 may include receiving access to a virtual gatekeeper resource linked to the cloud resource. The resource owner 204 and/or an administrator (e.g., subscription or tenant administrator) may receive just-in-time access to the virtual gatekeeper resource 16 in response to a security administrator approving the request for access to the virtual gatekeeper resource 16. For example, the security administrator may verify that the privileged operation(s) 18 are required for the cloud resource 10. The just-in-time access may be for an allotted time period to execute the privileged operation(s) 18. The allotted time period may be for n hours, where n is an integer.

At 406, method 400 may include sending a privileged operation request to perform one or more privileged operations on a cloud resource. For example, a resource owner 204 and/or an administrator (e.g., subscription or tenant administrator) may send a privileged operation request 12 to resource manager 106 during the allotted time period to perform one or more privileged operations 18 on cloud resource 10. For example, the resource owner 204 may want to unlink the cloud resource 10 from the virtual gatekeeper resource 16. The privileged operation request 12 may include, but is not limited to, an identification (ID) of the virtual gatekeeper resource 16 linked to the cloud resource 10 and an identification of a user sending the request (e.g., the resource owner 204 or the administrator).

Resource manager 106 may perform multiple authorization validations 22 and/or authentications on the privileged operation request 12 prior to providing access 26 to the virtual gatekeeper resource 16. The authorization validation 22 may include performing a validity check on the allotted time to ensure that the privileged operation request 12 is received during the allotted time for performing the privileged operations 18. In addition, the authorization validation 22 may include authenticating the cloud resource 10. The authorization validation 22 may also verify that the resource owner 204 and/or administrator has a correct level of access on the ID for the virtual gatekeeper resource 16 present in the privileged operation request 12. Resource manager 106 may forward the privileged operation request 12 to resource provider 108 to perform a final validation to ensure that the ID for the virtual gatekeeper resource 16 present in the privileged operation request 12 is the virtual gatekeeper resource 16 linked to the cloud resource 10 protecting the requested privileged operation 18.

At 406, method 400 may include performing the one or more privileged operations on the cloud resource using the access to the virtual gatekeeper resource. The access 26 to the virtual gatekeeper resource 16 may be for an allotted time period in response to resource manager 106 performing one or more authorization validations 22 on the privileged operation request 12 and resource provider 108 verifying that the cloud resource 10 is linked to the correct virtual gatekeeper resource 16. The resource owner 204 may receive the access 26 to the virtual gatekeeper resource 16 and may use the virtual gatekeeper resource 16 to perform the requested privileged operations 18 within the allotted time period. In an implementation, the access 26 may be just-in-time access to the virtual gatekeeper resource 16. For example, the resource owner 204 may use the access 26 to the virtual gatekeeper resource 16 to unlink the cloud resource 10 from the virtual gatekeeper resource 16 during a two hour allotted time period. The access 26 to the virtual gatekeeper resource 16 may be revoked upon exceeding the upper bound of the allotted time period One example use case may include a resource owner 204 requesting to disable soft delete on one or more cloud resources 10 within a resource subscription 102. Once the resource owner 204 receives the security administrator 202 approval to access the virtual gatekeeper resource 16, the resource owner 204 may use the access 26 to the virtual gatekeeper resource 16 to successfully disable soft delete on the one or more cloud resources 10.

As such, method 400 may be used to perform privileged operations 18 on cloud resources 10 protected using a virtual gatekeeper resource 16.

Figure 5:
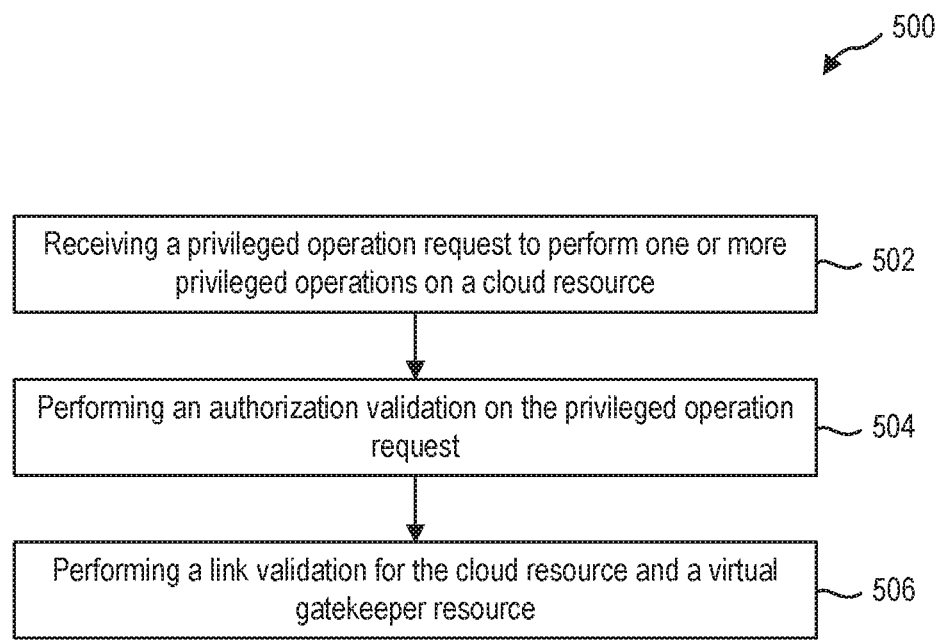
FIG. 5 illustrates an example method for providing access to a virtual gatekeeper resource in accordance with an implementation of the present disclosure.

Referring now to FIG. 5, illustrated is a method 500 for providing access to a virtual gatekeeper resource 16. The actions of method 500 may be executed by a resource manager 106. The actions of method 500 may be discussed below with reference to the architectures of FIG. 1.

At 502, method 500 may include receiving a privileged operation request to perform one or more privileged operations on a cloud resource. Resource manager 106 may receive a privileged operation request 12 from a resource owner 204 and/or an administrator (e.g., subscription or tenant administrator). The privileged operation request 12 may provide an identification of the virtual gatekeeper resource 16 linked to the cloud resource 10 and/or may provide an identification of an individual sending the request (e.g., the resource owner 204 and/or the administrator).

At 504, method 500 may include performing an authorization validation on the one or more privileged operations. Resource manager 106 may perform one or more authorization validations 22 to ensure or verify that the resource owner 204 requesting to perform the privileged operations 18 has a required level of access to the virtual gatekeeper resource 16. In an implementation, resource manager 106 may leverage privileged identity management (PIM) for providing approvals for accessing the virtual gatekeeper resource 16. For example, the authorization validation 22 may leverage PIM for multi-factor authentication (MFA)/MUA capabilities to verity that the user requesting to perform the privileged operations 18 may access the virtual gatekeeper resource 16. PIM may determine an allotted time period for executing the privileged operations 18. As such, the authorization validations 22 may also perform a check to ensure that the privileged operation request 12 is received during the allotted time for performing the privileged operations 18. In addition, the authorization validation 22 may include authenticating the cloud resource 10.

At 506, method 500 may include performing a link validation for the cloud resource and the virtual gatekeeper resource. Resource provider 108 may perform a link validation 24 to ensure that the cloud resource 10 is linked to the virtual gatekeeper resource 16 originally selected for the cloud resource 10. For example, the resource provider 108 may compare the identification of the virtual gatekeeper resource 16 forwarded with the privileged operation request 12 with a datastore storing information regarding the virtual gatekeeper link 14. If the identification of the virtual gatekeeper resource 16 matches the information regarding the virtual gatekeeper link 14 for the cloud resource 10, resource provider 108 may determine that the correct virtual gatekeeper resource 16 is linked to the cloud resource 10. However, if the identification of the virtual gatekeeper resource 16 is different from the information regarding the virtual gatekeeper link 14 for the cloud resource, resource provider 108 may not validate the virtual gatekeeper link 14 and may prevent the requested operation. In addition, the resource provider 108 may perform a verification that the requested operation is included in the list of privileged operations 18 protected by the virtual gatekeeper resource 16.

In an implementation, the access 26 may be provided after a security administrator 202 approves the privileged operation request 12. For example, the security administrator 202 may receive a notification via a message, such as, but not limited to an e-mail message or a text message, regarding the pending request. The security administrator 202 may review any pending privileged operation requests 12 and may approve or deny the privileged operation requests 12. In addition, the security administrator 202 may revoke actively granted accesses 26 to the virtual gatekeeper resources 16 at any time.

As such, method 500 may be used to ensure that execution of any privileged operations 18 on cloud resources 10 using the virtual gatekeeper resource 16 occur after multiuser authentication and multiple levels of verifications are performed.

Figure 6:
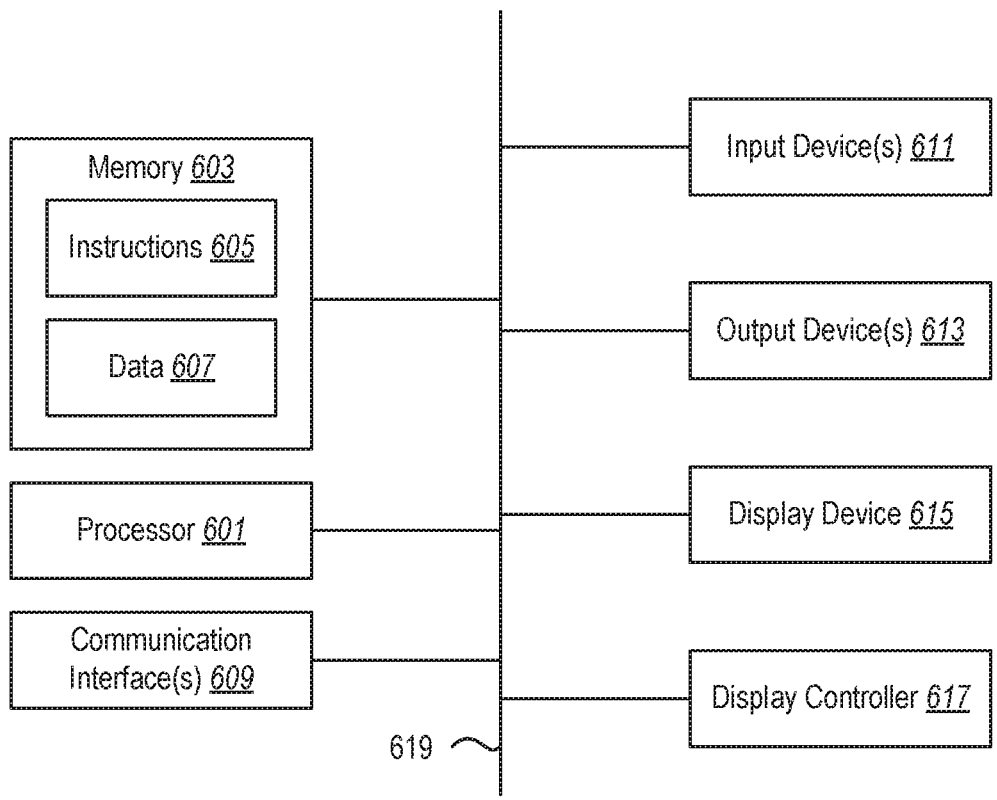
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A cloud computing system, comprising:
   one or more processors;
   memory in electronic communication with the one or more processors; and
   instructions stored in the memory, the instructions being executable by the one or more processors to:
      create a cloud resource in a different security domain of a cloud computing system than a secure security domain where a virtual gatekeeper resource resides, wherein the virtual gatekeeper resource prevents a list of privileged operations from occurring without prior approval and the secure security domain is separate from the security domain of the cloud resource;
      establish a virtual gatekeeper resource link between the cloud resource and the virtual gatekeeper resource to secure the cloud resource using the virtual gatekeeper resource, wherein the virtual gatekeeper resource enforces secure access control to the cloud resource for the list of privileged operations;
      receive a request to perform a privileged operation of the list of privileged operations on the cloud resource, wherein the request includes an identification of the virtual gatekeeper resource linked with the cloud resource and an identification of a user sending the request;
      perform an authorization validation on the request to authorize the user to access the cloud resource;
      perform a link validation to verify that the identification of the virtual gatekeeper resource linked to the cloud resource is a correct virtual gatekeeper resource; and
      provide just-in-time access to the virtual gatekeeper resource in response to the authorization validation and the link validation for the user to perform the privileged operation.

2. The cloud computing system of claim 1, wherein the authorization validation uses Privileged Identity Management (PIM) for authenticating the user using one or more of a multi-factor authentication (MFA) or a multi-user authorization (MUA).

3. The cloud computing system of claim 1, wherein the instructions are further executable by the one or more processors to:
   determine a time period for accessing the virtual gatekeeper resource, and
   wherein the just-in-time access to the virtual gatekeeper resource occurs during the time period.

4. The cloud computing system of claim 3, wherein the authorization validation further verifies that the request is received within the time period for accessing the virtual gatekeeper resource.

5. The cloud computing system of claim 1, wherein the instructions are further executable by the one or more processors to:
   apply at least one security policy to the virtual gatekeeper resource, wherein the at least one security policy further specifies a deployment scope of the virtual gatekeeper resource and restricts access to the virtual gatekeeper resource.

6. The cloud computing system of claim 1, wherein the instructions are further executable by the one or more processors to:
   verify that the requested privileged operation is included in the list of privileged operations protected by the virtual gatekeeper resource.

7. The cloud computing system of claim 1, wherein the instructions are further executable by the one or more processors to provide the user the just-in-time access to the virtual gatekeeper resource in response to a security administrator of the virtual gatekeeper resource providing approval for the privileged operation.

8. The cloud computing system of claim 1, wherein the list of privileged operations is customized by a security administrator of the virtual gatekeeper resource.

9. A method, comprising:
   creating a cloud resource in a different security domain of a cloud computing system than a secure security domain where a virtual gatekeeper resource resides, wherein the virtual gatekeeper resource prevents a list of privileged operations from occurring without prior approval and the secure security domain is separate from the security domain of the cloud resource;

establishing a virtual gatekeeper resource link between the cloud resource and the virtual gatekeeper resource to secure the cloud resource using the virtual gatekeeper resource, wherein the virtual gatekeeper resource enforces secure access control to the cloud resource for the list of privileged operations;

receiving a request to perform a privileged operation of the list of privileged operations on the cloud resource, wherein the request includes an identification of the virtual gatekeeper resource linked with the cloud resource and an identification of a user sending the request;

performing an authorization validation on the request to authorize the user to access the cloud resource;

performing a link validation to verify that the identification of the virtual gatekeeper resource linked to the cloud resource is a correct virtual gatekeeper resource; and providing the user just-in-time access to the virtual gatekeeper resource in response to the authorization validation and the link validation to perform the privileged operation.

10. The method of claim 9, wherein the authorization validation uses Privileged Identity Management (PIM) for authenticating the user using one or more of a multi-factor authentication (MFA) or a multi-user authorization (MUA).

11. The method of claim 9, further comprising:
determining a time period for accessing the virtual gatekeeper resource, and
wherein the just-in-time access to the virtual gatekeeper resource occurs during the time period.

12. The method of claim 11, wherein the authorization validation further verifies that the request is received within the time period for accessing the virtual gatekeeper resource.

13. The method of claim 9, further comprising:
applying at least one security policy to the virtual gatekeeper resource, wherein the at least one security policy further specifies a deployment scope of the virtual gatekeeper resource and restricts access to the virtual gatekeeper resource.

14. The method of claim 9, further comprising:
verifying that the requested privileged operation is included in the list of privileged operations protected by the virtual gatekeeper resource.

15. The method of claim 9, wherein providing the user the just-in-time access to the virtual gatekeeper resource is further in response to a security administrator of the virtual gatekeeper resource providing approval for the privileged operation.

16. The method of claim 9, wherein the list of privileged operations is customized by a security administrator of the virtual gatekeeper resource.

17. A method, comprising:
creating a cloud resource in a security domain of a cloud computing system;
linking the cloud resource to a virtual gatekeeper resource in a secure security domain in the cloud computing system, wherein the virtual gatekeeper resource enforces secure access control to the cloud resource for a list of privileged operations associated with the virtual gatekeeper resource and the secure security domain is separate from the security domain of the cloud resource;
sending a privileged operation request to perform one or more privileged operations of the list of privileged operations on the cloud resource;
receiving just-in-time access to the virtual gatekeeper resource linked to the cloud resource for an allotted time period in response to approval of the privileged operation request; and
performing the one or more privileged operations on the cloud resource using the just-in-time access to the virtual gatekeeper resource during the allotted time period.

18. The method of claim 17, further comprising:
revoking the just-in-time access to the virtual gatekeeper resource in response to exceeding an upper bound of the allotted time period.

19. The method of claim 17, wherein the approval is provided by a security administrator of the virtual gatekeeper resource.

20. The method of claim 19, wherein the approval is further provided in response to an authorization validation performed on the privileged operation request to authenticate a user and the cloud resource, and
in response to a link validation to verify a virtual gatekeeper resource link between the cloud resource and the virtual gatekeeper resource.

* * * * *